Jan. 29, 1935.  W. R. WILSON  1,989,180
SELECTIVE INSURANCE CHART
Filed Jan. 27, 1933   3 Sheets-Sheet 1
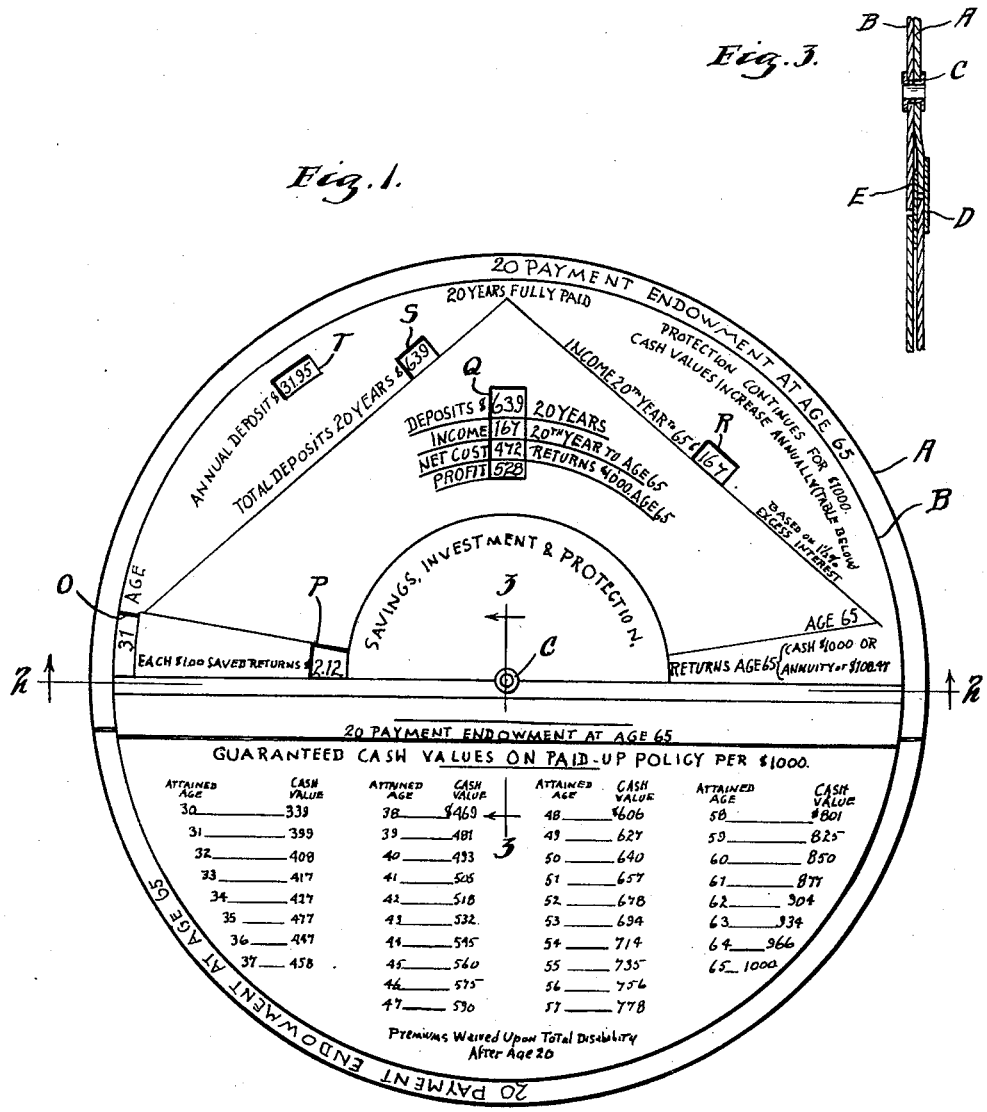
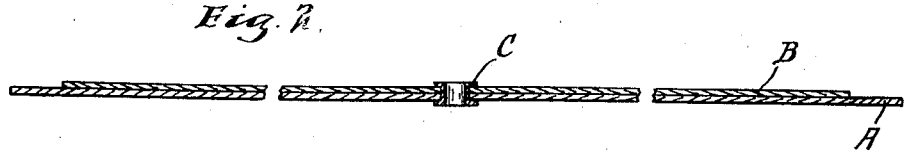
INVENTOR.
WILLIAM R. WILSON.
BY HIS ATTORNEYS.
Williamson & Williamson

INVENTOR,
WILLIAM R. WILSON.
BY HIS ATTORNEYS.

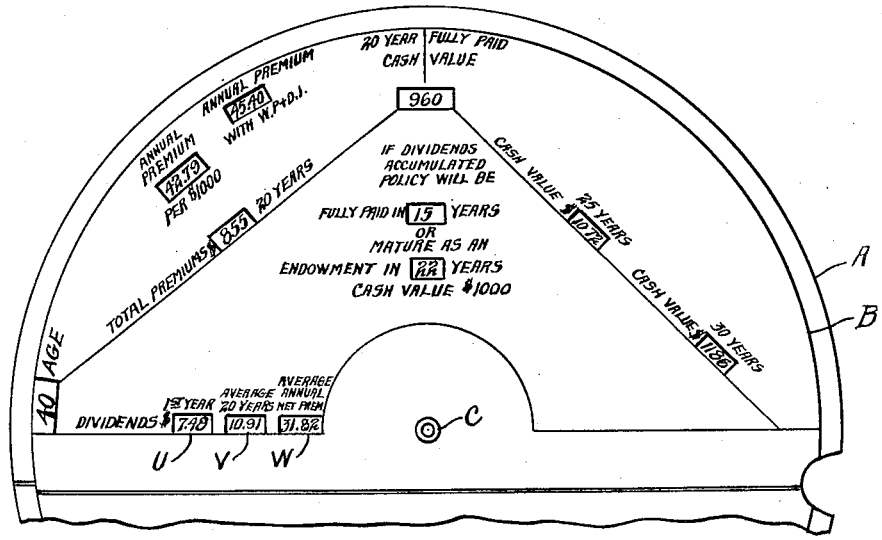

Patented Jan. 29, 1935

1,989,180

UNITED STATES PATENT OFFICE 1,989,180

SELECTIVE INSURANCE CHART

William Rolla Wilson, Minneapolis, Minn.

Application January 27, 1933, Serial No. 653,917

2 Claims. (Cl. 35—12)

This invention relates to selective informational devices or charts wherein comprehensive data or information concerning any one of a number of indexed subjects may be quickly obtained and displayed by adjustment of a rotary finding element.

In the sale of life insurance, installment plan investments and the like, it is difficult for the salesman to present to the prospective purchaser a comprehensive résumé of the policy or contract so that the prospective purchaser may visualize the entire set up and balance or contrast his obligations with the benefits to be derived. As insurance and installment investments are usually sold, various items of information are given the prospective purchaser piece by piece, with the result that the subject matter is often confused and is not presented in a favorable manner.

It is an object of my invention to provide a simple, compact, selective informational device or chart whereby correlated items of information relating to any one of a number of different subjects may be quickly and easily selected and considered together, by means of a rotary finding disk associated with a second disk or sheet which carries a multiplicity of entries arranged circumferentially in several series, each series being spaced a different radial distance from the axis of the finding disk.

It is a further object to provide an informational device of the rotary disk type which may be compactly folded for convenient carrying or disposal.

A more specific object is to provide a selective life insurance chart which may be very quickly and easily adjusted to indicate, simultaneously, a number of informational items enabling the prospective purchaser to visualize the entire set up of the policy or contract for a particular age, including obligations to be incurred as well as benefits to be received.

Another object is to provide an informational device of the type described wherein a relatively large number of informational items may be simultaneously selected and displayed on a relatively small device due to the arrangement of several series of entries in cooperation with a rotary finding disk having a multiplicity of viewing apertures arranged at various angles with reference to its horizontal diameter.

These and other objects and advantages of the invention will be more fully set forth in the following description made in connection with the accompanying drawings, in which like reference characters refer to similar parts throughout the several views, and in which:—

Fig. 1 is a plan view of an assembled selective chart embodying my invention and relating to a particular type of insurance policy;

Fig. 2 is a cross section taken on the line 2—2 of Fig. 1;

Fig. 3 is a fragmentary cross section taken on the line 3—3 of Fig. 1 and showing the manner in which the device is constructed to permit compact folding of the same;

Fig. 6 is a fragmentary plan view of an embodiment of my invention designed to selectively give information concerning a different type of life insurance policy.

Figure 5:
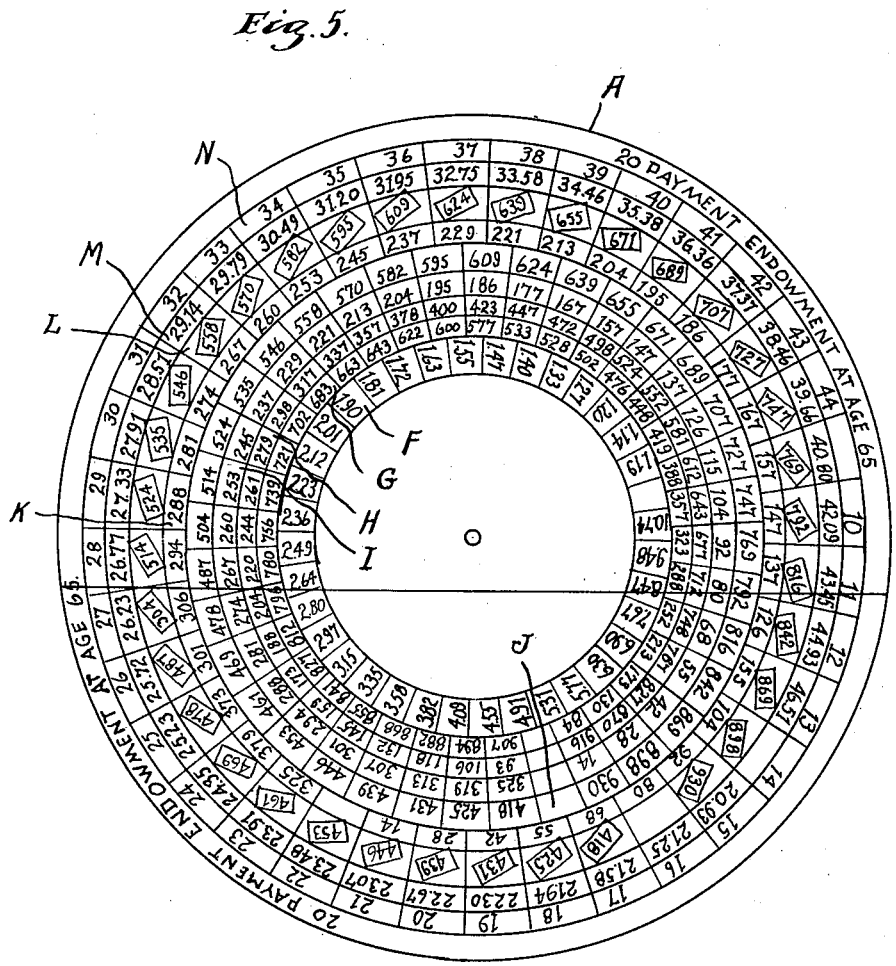
Fig. 5 is a plan view of the backing or compilation sheet detached.

Referring to the embodiment illustrated in Figs. 1 to 5 inclusive, it will be seen that two concentric superimposed disks A and B are employed pivotally secured together by suitable means such as a rivet or fastener C. The disks A and B may be constructed of any suitable thin sheet material, such as cardboard, celluloid, sheet metal or the like. The backing or compilation sheet A is preferably of somewhat larger diameter than the finder sheet B in order that a narrow circumferential or marginal portion of sheet A may be exposed to view and on said marginal portion information may be printed, such as the nature of the policy, contract or other general subject to which the device relates. Each of the disks A and B is made up of two complementary sections hinged together by suitable means, such as flexible strips D and E which lap the two sections and are adhesively or otherwise secured to the backs thereof. It will be noted that the dividing line for each of the disks is somewhat below the horizontal diameter and that the dividing line for the outer or finder disk is somewhat below or outwardly disposed of the dividing line for the compilation or backing disk A. This enables the outer or finder disk to be smoothly folded over the rear disk A when the disks have been adjusted to dispose the dividing lines in parallel relation.

The rear disk A has printed thereon several series of circumferentially arranged entries, said several series being compactly and concentrically arranged with reference to the axis of the two disks. It will be noted that the entries of the first series F (see Fig. 5) are readable radially of the disk, while the next succeeding several series G to K inclusive are readable circumferentially of the disk. The next succeeding series of entries L, while generally arranged, like all the other entries, circumferentially of the disk, extend in lines disposed obliquely with reference to the radii of disk A.

The outermost series of entries N is positioned for alignment with a "key" viewing recess O formed in the marginal edge of the finder disk B. The first mentioned series of entries F on disk A is positioned for registration with a viewing aperture P which extends radially of disk B in such manner that the exposed entry will be readable substantially along the horizontal diameter of disk B. The next successive series of entries G to J inclusive are positioned for registration in an elongated viewing aperture Q formed in finder disk B and disposed substantially on the vertical diameter of the disk. The series of entries K are so arranged that they will register with a viewing aperture R in the finder disk B and the series of obliquely extending entries L are registrable with a viewing aperture S disposed to the left of the elongated aperture. The series of entries M positioned just inwardly of the key or index age series N are so arranged as to register with the viewing aperture T "annual deposits".

If desired, additional information which is independent from the key or index entries, may be printed on the lower section of the finder disk B. As shown, guaranteed cash values of the policy appear on said lower section.

The nature of the several items of information selected by the finder disk B is made clear by appropriate identifications printed on the face of the finder disk adjacent the respective viewing apertures. It will be noted that the series of entries G, H, I and J are successively and compactly arranged on the compilation disk A and are all visible through the elongated common viewing aperture Q. It will further be noted that corresponding entries of the said series G to J inclusive are radially aligned with reference to the disks and when viewed through aperture Q of the finder disk are in statement or accounting form; that is, in the embodiment illustrated, the entry for total deposits is displayed through the upper portion of aperture Q. The entry for total income is positioned just below the total deposits and the entry showing the net cost (the difference between deposits and income) is positioned just below the income as the remainder and the entry for profit (the difference between net cost and the principal amount of the policy) is disposed below the entry for net cost. This is a valuable feature in that it enables the prospective purchaser to readily ascertain how the figures are derived and to quickly compare the important information.

The value of my device as a sales medium for insurance and the like will be apparent from a study of the embodiment illustrated in Fig. 1. A salesman desiring to interest a prospect adjusts the finder disk B to expose, through the recessed marginal edge O of disk B the "key" or index information appropriate, (in insurance sales the entries indicating the age of the prospect). This automatically aligns the viewing apertures P to T inclusive with the correct entries indicating the desired information. Thus in the form illustrated in Fig. 1 a prospective purchaser aged 31 can in a very comprehensive manner obtain all the information he desires concerning the benefits to be received from and the obligations incurred by subscribing for the particular policy in question.

More specifically the prospect can very quickly determine his annual deposit or premium, the total deposits through the premium paying term of the policy, the total income over the income paying years, the endowment, the net cost, the net profit and his return for each dollar saved.

The lines or legends running from the age entry position diagonally to the upper central portion of disk B and then from the said point obliquely and downwardly in association with the particular arrangement of the viewing apertures T, R and S enable the prospective purchaser to quickly correlate the obligations and benefits of the policy.

By having the characters or figures of one or more of the series of entries extending radially with respect to disk A, horizontally extending viewing apertures may be formed in the disk adjacent the horizontal diameter to facilitate reading of the entries, while the other series of entries may be read through viewing apertures which extend substantially parallel with the viewing aperture P but which are approximately on the vertical diameter of the disk. This makes possible a multiplicity of series of entries with corresponding viewing apertures of large number on a small, compact device.

Figure 4:
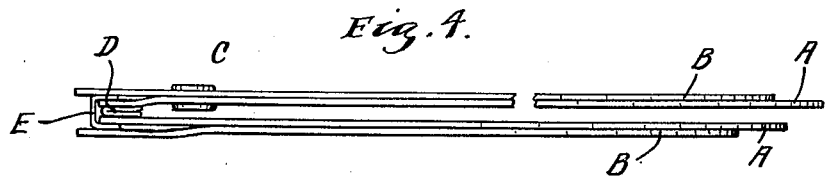
Fig. 4 is an end elevation of the device shown in Fig. 1 in its folded position.

The device may be folded compactly for disposal in an envelope or bill fold, as illustrated in Fig. 4, the finder disk B folding about the backing or compilation disk A when the dividing lines of the two disks are disposed in parallel relation.

In Fig. 6 an embodiment of my invention designed for participating type of twenty-payment insurance policies is illustrated. The general construction of this form is similar to the form first described. It will, however, be noted that the two disks A and B have recesses in the marginal edges thereof which may be quickly brought into registration to assure proper relation of the division lines of the two disks for folding.

In the form entries showing average dividends for the first year and over the premium paying period are shown through viewing apertures U and V. The average net premium is shown through viewing aperture W. The series of entries for the above identified items of information are arranged with the characters extending radially of the backing disk. The printed data shown in Fig. 6 makes clear the nature of the information selectively given, as will be apparent from the drawings.

From the foregoing description it will be seen that I have provided a very simple, inexpensive and highly efficient device for selectively displaying information or statistical data relative to a series of different subjects, policies, contracts or the like and that further, the use of my improved device promotes materially an increase in sales of the contract, service or other thing to which the device pertains by giving the prospective purchaser a comprehensive understanding of the entire set up.

It further will be seen that the device may be easily and quickly adjusted in accordance with the desired "key" or index.

It will, of course, be understood that various changes may be made in the form, details, proportions and arrangement of the parts, without departing from the scope of my invention, which, generally stated, consists in a device capable of carrying out the objects above set forth, in the novel parts and combinations of parts disclosed and defined in the appended claims.

What is claimed is:—

1. An informational device comprising a rear disk carrying a multiplicity of entries, a front finder disk provided with recesses through which selected entries may be observed and means for concentrically pivoting said disks together, said disks each being constructed of sheet material and comprising a pair of arcuate sections hingedly connected along a chord line thereof, said chord line of the front disk being slightly further from said pivoting means than said chord line of the rear disk, whereby said disks may be folded along said chord lines, one disk about the other, when said disks are so disposed relative to each other that said respective chord lines are adjacent and parallel to each other.

2. An informational device comprising a rear disk carrying a multiplicity of entries, a front finder disk provided with recesses through which selected entries may be observed, means for concentrically pivoting said disks together, each of said disks being divided along a chord line thereof into a pair of arcuate sections and the sections of each disk being hingedly connected together, said dividing lines being so disposed relative to said pivoting means that said disks may be folded one over the other when said dividing lines are positioned adjacent and parallel to each other, and means on the peripheral edges of said disks for enabling the same to be quickly adjusted into correct position for folding.

WILLIAM ROLLA WILSON.